United States Patent Office 3,614,921
Patented Oct. 26, 1971

3,614,921
PHOTOELECTRIC DEVICE FOR DETECTING THE FOCUSING
Torakiyo Yamanaka and Keiichi Sakaguchi, Yokohama-shi, and Kazuya Hosoe, Tokyo, Japan, assignors to Canon Kabushiki Kaisha, Tokyo, Japan
Filed Dec. 17, 1969, Ser. No. 885,936
Claims priority, application Japan, Dec. 25, 1968, 43/94,496
Int. Cl. G03b 3/12
U.S. Cl. 95—44 C          4 Claims

ABSTRACT OF THE DISCLOSURE

Photoelectric device for detecting whether or not the image of an object to be photographed is correctly focused. On the optical axis of an objective a fixed iris having a small hole on the optical axis and another small hole of the same diameter as that of the small hole on the off-axis position is provided. Behind the other hole a prism to invert the image of the object in the vertical or horizontal is placed and another prism is placed behind the small hole for compensating the light path length to coincide with the light path passing through said first prism. On the focusing plane of the objective lens, two photoconductive elements are provided on both sides of the optical axis, and two elements are within a plain containing the optical axis and the center of the light flux passing through the other hole. The device can detect the image correctly even when the distribution of brightness of an object is asymmetrical with respect to the optical axis, since two mutually inverted images are superposed upon two photoconductive elements.

---

This invention relates to a device for use with cameras and the like for photoelectrically detecting whether or not an object is correctly focused.

In accordance with the present invention, the focusing of an object is photoelectrically detected and with the device of this invention, it is possible to automatically focus an object with high degree of accuracy even when the distribution of brightness of the object is asymmetrical with respect to the optical axis.

The device of this invention comprises a fixed aperture having a small diameter hole in alignment with the optical axis of an objective lens and another small hole which has the same diameter with that of said first mentioned hole and is spaced apart from the optical axis, an optical system for inverting vertically or horizontally the image formed by light passing through said off-axis small diameter hole, and two photoconductive elements disposed on both sides of the optical axis in a plane containing the optical axis and the center of the light flux passing through said off-axis small diameter hole at a reference focusing position of the objective lens, whereby whether the object is correctly focused or not can be detected by detecting the output difference between said two photoconductive elements by utilizing the fact that when the image is correctly focused at said reference focusing position, the light impinged upon said two photoconductive elements has the same intensity while when the object is out of focus at said reference focusing position, the light impinged upon said two photoconductive elements is not equal in intensity.

When two photoconductive elements are arranged on both sides of the optical axis of an objective at the reference focusing position thereof so that the images are formed upon the two photoconductive elements by the light beams passing through the different paths, the difference in intensity of light impinged upon the two photoconductive elements may be utilized in order to detect with a high degree of accuracy whether an object is correctly focused or not. However, the above described system is limited to when the distribution of brightness of an object is symmetrical with respect to the optical axis. When the distribution is asymmetrical, satisfactory results are not expected. However, according to the present invention, two mutually inverted images are superposed upon the photoconductive element so that even when the distribution of brightness of an object is asymmetrical with respect to the optical axis, the variation in resistance of the photoconductive elements is not influenced by the asymmetrical distribution of brightness of an object. Therefore, whether an object is correctly focused or not can be detected all the time with a higher degree of accuracy.

The present invention will be described more in detail with respect to illustrative embodiments shown in the attached drawings, in which.

Figure 1:
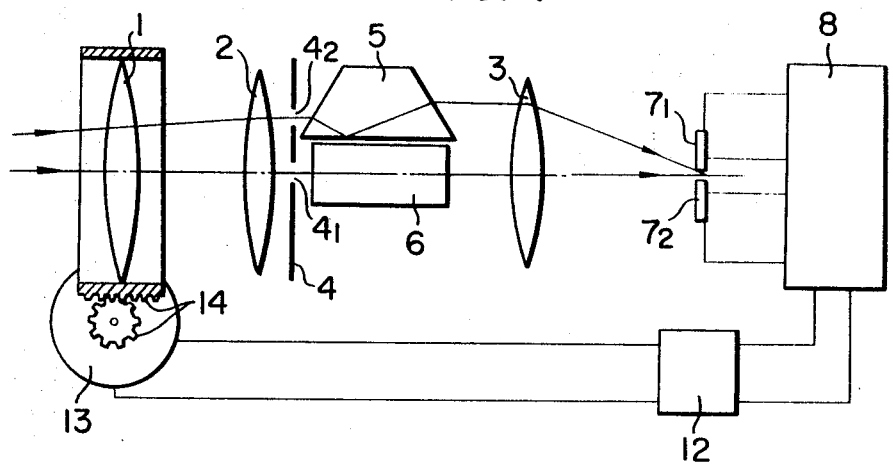
FIG. 1 is a schematic side view of the essential parts of a device in accordance with the present invention.

Referring to FIG. 1, reference numerals 1, 2 and 3 designate objective lenses arranged on an optical axis and a fixed iris 4 is disposed backwardly of the objective lens 2 and has a small diameter hole $4_1$ in alignment with the optical axis and another small diameter hole $4_2$ which is spaced apart from the hole $4_1$ and has the same diameter with that of the hole $4_1$. A prism 5 having an odd number of reflecting surfaces is so disposed that the light ray coming through the off-axis hole $4_2$ may reverse its path in the vertical or horizontal plane (in the horizontal plane in the present embodiment). A prism 6 is so disposed that the light beam from the hole $4_1$ may travel the same distance as that of the light beam passing through the prism 5. Two photoconductive elements $7_1$ and $7_2$ having the same characteristics are disposed so as to be symmetrical with respect to the optical axis and in facing with the objective lens 3 in a plane containing centers of the light fluxes passing through the holes $4_1$ and $4_2$, respectively, at a reference focusing position.

In the optical system described above, the images of an object through the holes $4_1$ and $4_2$ are overlappingly formed in mutually inversed relation upon the photoconductive elements $7_1$ and $7_2$. When the images are correctly focused upon the referance focusing plane, the overlappingly divided images upon the photoconductive elements $7_1$ and $7_2$ are symmetrically equal and the intensities of light detected by the elements $7_1$ and $7_2$ become equal so that the resistances of both elements are also equal. On the other hand, when the images are out of focus at the reference focusing plane, that is when the images are formed forwardly or backwardly of the reference focusing plane, the image formed by the light passing through the off-axis hole $4_2$ is deviated from that formed by the light passing through the on-axis hole $4_1$ which is appeared at the same plate as in the case of in-focus but with blur. Furthermore, the image formed by the light passing through the hole $4_2$ appears upon one photosensitive element with a larger area than upon the other element, so that the intensities of light detected by the two photoconductive elements become different from each other. That is, the resistances of the two photosensitive elements become different. When the images are formed forwardly of the two photosensitive elements $7_1$ and $7_2$, the resistance of the element $7_1$ becomes larger than that of the element $7_2$ and vice versa.

Figure 2:
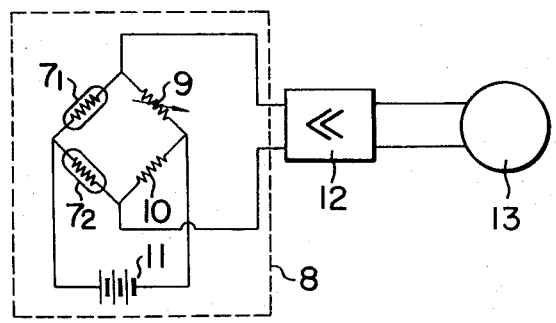
FIG. 2 is a ciricuit diagram thereof.

As shown in FIG. 2, the two photosensitive elements 7₁ and 7₂ are connected with resistors 9 and 10 and a power source 11 so as to constitute a bridge circuit, so that the difference between the resistances of the photosensitive elements 7₁ and 7₂ may be detected, whereby the correct focusing can be achieved by minimizing the resistance difference between the two elements 7₁ and 7₂. Since the output from the bridge circuit is positive or negative depending upon whether the object is forward-focused or backward-focused, the output is amplified by an amplifier 12 so as to reverse the rotation of a servomotor 13, which is adapted to move forwardly or backwardly the objective lens 1 through a suitable gear train 14 and automatically stop the lens 1 when the object is focused correctly at the reference focusing plane.

Figure 3:
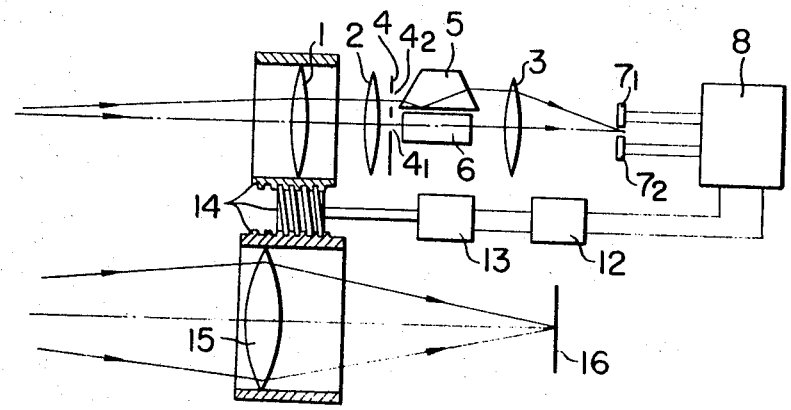
FIG. 3 is a schematic side view illustrating the device of the present invention incorporated in a still camera.

FIG. 3 is a schematic diagram illustrating the device of the present invention incorporated in a still camera. A photolens 15 is arranged in parallel with the lens 1 and is moved forwardly or backwardly together with the lens 1 by the servomotor 13 through the gear train 14. The optical systems of the automatic focusing device and the camera are so arranged that an object is correctly focused upon the plane of film 16 when the object is focused upon the photoconductive elements 7₁ and 7₂ in the manner as described hereinabove. It is seen that the photolens 15 may be automatically stopped when an object is correctly focused upon the film plane 16 in the same manner as described above.

Figure 4:
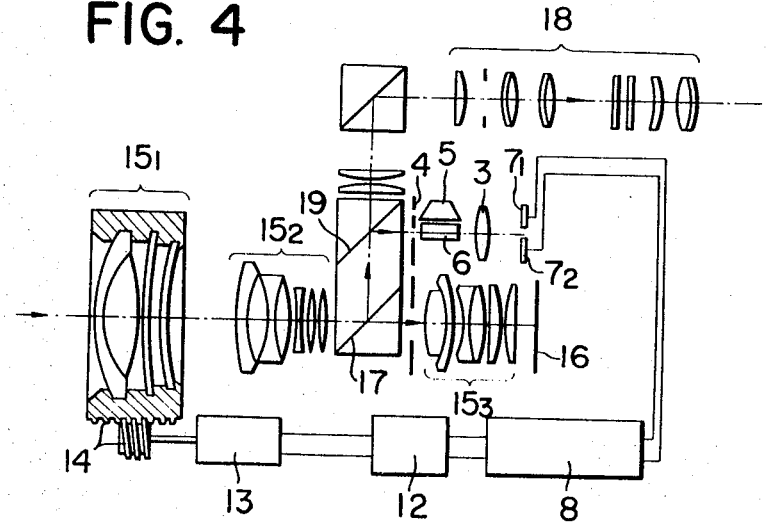
FIG. 4 is a schematic side view illustrating the device of the present invention incorporated in a movie camera.

FIG. 4 is a schematic diagram illustrating the automatic focusing device in accordance with the present invention incorporated in a cine camera. Among the photolens groups 15₁, 15₂ and 15₃, the first and second lens groups 15₁ and 15₂ are utilized in common as an objective lens for range detecting. A semi-transparent mirror 17 is disposed slantly of the optical axis so that the light from the lens group 15₂ to the film 16 may be split toward a viewfinder optical system generally indicated by 18. In the optical path toward the viewfinder optical system 18 from the mirror 17 is disposed another semi-transparent mirror 19 so that the light may be further split into the automatic focusing system. As in the case of the embodiment illustrated in FIG. 3, all of the optical systems are so arranged that when an object is correctly focused upon the two photosensitive elements 7₁ and 7₂, the object is also correctly focused upon the film plane 16. The mode of operation is the same as that described above.

What is claimed is:

1. A photoelectric device for use in cameras and the like for detecting whether or not an object is focused, which comprises a fixed iris having a small diameter hole in alignment with the optical axis of an objective and another small diameter hole in spaced apart from said optical axis; an optical system provided in the optical path for inverting vertically or horizontally the image formed by light passing through said other hole; two photoconductive elements provided at a reference focusing position of said objective on both sides of the optical axis within a plane containing the optical axis and the center of the light flux passing through said other hole; and means for detecting the output difference between said two photoconductive elements so as to detect whether an object is correctly focused or not by utilizing the fact that when the image is correctly focused at said reference focusing position, the light amounts impinged on said two photoconductive elements are equal while when the image is out of focus at said reference focusing position the light amounts impinged upon said two photoconductive elements are not equal.

2. A photoelectric device according to claim 1, wherein said optical system for inverting the image comprising a first prism having odd number of the reflecting surfaces and is provided behind said another hole and said device further comprising a second prism provided behind the first mentioned hole for imparting the same variation as that caused by the first prism to the length of the light path of the light flux passing through said first mentioned hole.

3. A camera provided with the photoelectric device according to claim 1 which comprises a photographic lens provided parallel with said objective lens, a linking means to interconnect both the photographic lens and the objective lens to a servomotor to move both lenses in the same direction so as to coincide the focal point of the lenses on the photoconductive elements and on a film surface, respectively.

4. A cine camera provided with the photoelectric device according to claim 1, which comprises photographic lens groups, at least one of the groups being used for an objective for range detecting; a first semitransparent mirror disposed behind said lens groups for dividing light path to the film surface toward a finder system; a second semitransparent mirror disposed on the way to the finder system to divide the light path toward the photoelectric device.

References Cited
UNITED STATES PATENTS

| | | | |
|---|---|---|---|
| 3,367,254 | 2/1968 | Townsley | 95—44 C |
| 3,493,764 | 2/1970 | Craig | 95—44 X |
| 3,504,610 | 4/1970 | Donitz | 95—44 |
| 3,511,156 | 5/1970 | Larks | 95—45 |
| 3,529,528 | 9/1970 | Leitz | 95—44 C |

SAMUEL S. MATTHEWS, Primary Examiner

M. HARRIS, Assistant Examiner

U.S. Cl. X.R.

95—45